UNITED STATES PATENT OFFICE.

CHARLES PHELPS, OF OSKALOOSA, IOWA.

PRESSURE-REGULATOR FOR WATER-HEATING SYSTEMS.

No. 896,856.  Specification of Letters Patent.  Patented Aug. 25, 1908.

Application filed August 23, 1904. Serial No. 221,823.

*To all whom it may concern:*

Be it known that I, CHARLES PHELPS, a citizen of the United States, residing at Oskaloosa, in the county of Mahaska and State of Iowa, have invented a certain new and useful Pressure-Regulator for Water-Heating Systems, of which the following is a specification.

My object is to provide a device in the nature of an attachment that may be readily, quickly and easily placed in communication with a water heating system. Said device is designed to prevent water from expanding and boiling over until a certain predetermined pressure has been reached, so that the water in the heating system may be heated to a point above the boiling point and maintained at such heat without boiling over and discharging through the overflow pipe until after the pressure within the heating system reaches a certain predetermined degree and then the water will discharge to the overflow tank and after the water has cooled, all that remains in the tank will return to the heating system by means of a check valve located between the valve that leads to the overflow tank and the heating system.

My invention is designed to be used in the nature of an attachment to be applied to any ordinary water heating system for warming buildings.

My invention consists in the construction, arrangement and combination of the attachment with a hot water heating system and an overflow tank, as hereinafter more fully set forth, pointed out in my claims and illustrated in the accompanying drawings, in which—

Figure 1:
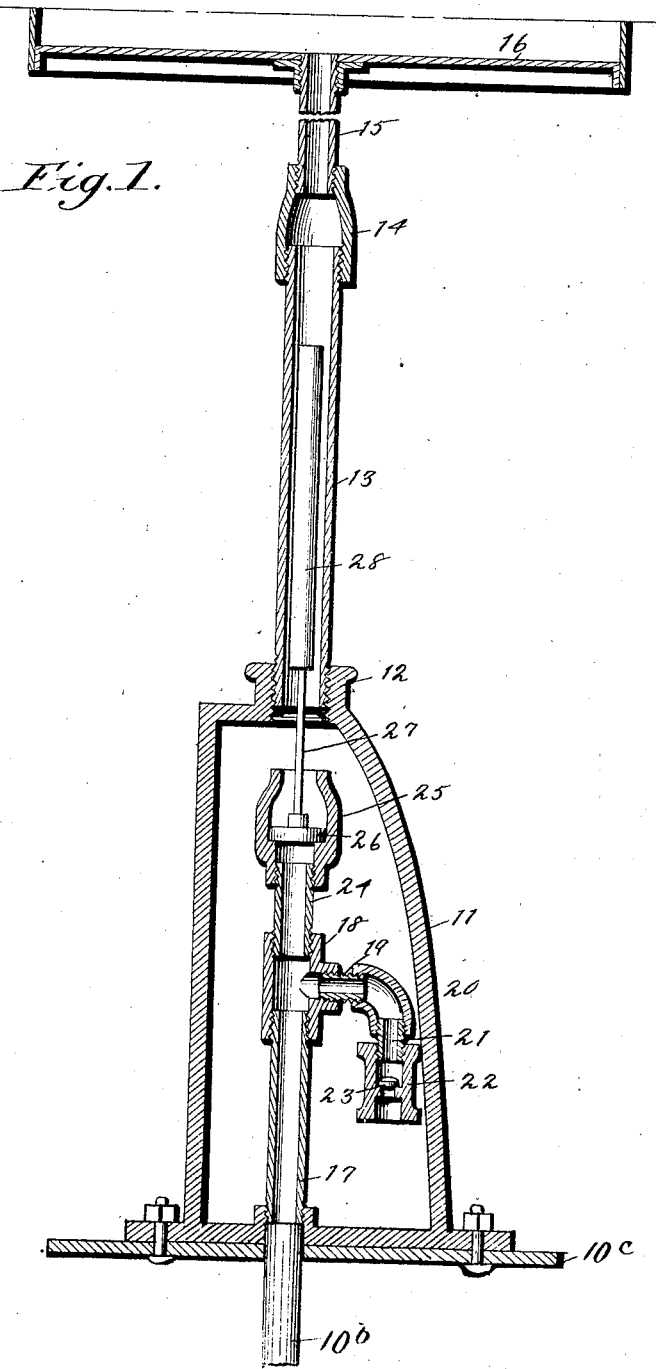
Figure 2:
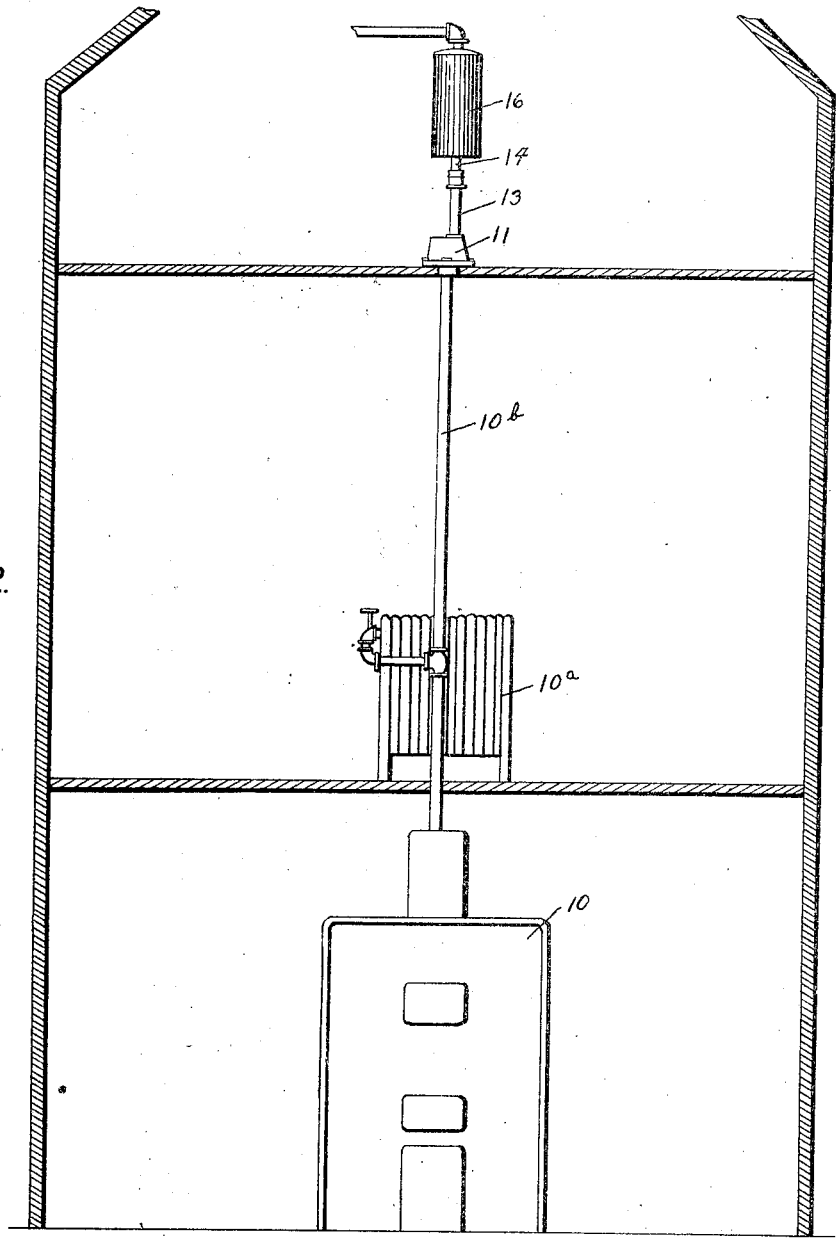

Figure 1 shows a longitudinal, central, sectional view of a pressure regulator for water heating systems embodying my inventions, and Fig. 2 shows a diagram illustrating a complete heating system with my improved pressure regulator applied thereto.

Referring to the accompanying drawings, I have used the reference numeral 10 to indicate a hot water heater, 10ᵃ a radiator connected therewith, and 10ᵇ a pipe extending upwardly from the radiator and connected with my improved pressure regulator.

The numeral 10ᶜ indicates the floor of a building, and mounted upon the floor is a water receptacle 11, preferably made of cast metal and provided with a screw threaded extension 12 at its top. Screwed into the extension 12 is a relatively large pipe 13, for purposes hereinafter made clear, and at the top of the pipe 13 is a reducer 14 screwed to a relatively small pipe 15 which in turn is connected to and communicates with an open topped overflow tank 16. Mounted within the receptacle 11 is a short pipe 17 communicating with the heater 10. At the top of the short pipe 17 is a T 18. A screw threaded nipple 19 is connected with one branch of the T and extends horizontally. An elbow 20 is screwed to the nipple 19 and inclines downwardly. A screw threaded nipple 21 connects with the other end of the elbow 20 and also with a check valve casing 22 in which is a check valve 23 of the ordinary construction, arranged to prevent the passage of water from the T 18 through the valve casing 22 and to permit the passage of water in the opposite direction. Screwed to the top of the T 18 is a short pipe 24, which pipe is also screwed to the safety valve casing 25 to provide communication between the T and the safety valve casing. Mounted in the safety valve casing is the valve 26 having a stem 27 which projects into the large pipe 13 above the receptacle 11. Located in the pipe 13 is a weight 28 which rests upon the valve stem 27 and is contained within the pipe 13, which pipe serves as a guide for the weight and the weight is of such diameter that water may readily pass through the pipe 13 around the weight.

In practical use, it is obvious that my attachment may be assembled ready for use and shifted and handled with all of the parts connected as required for use and it may be attached to a hot water heating system by simply securing the lower end of the receptacle 11 to a water heater and screwing the reducer 14 to the pipe that communicates with the overflow tank.

In practical use and assuming that the weight 28 is sufficient to hold the valve 26 closed until a pressure of thirty pounds to the square inch is applied to the under surface of the safety valve 26, it is obvious that the water in the heater will be heated to a point considerably above the boiling point before steam will generate, because it is well known that steam cannot generate in an inclosed receptacle unless there is a space in which the steam may expand, and in this case the heating system will be full, up to the valve 26 and hence the said valve will not open until the pressure exceeds thirty pounds to the square inch. Hence the water in the heating system can be kept heated to a point materially above the boiling point and thus give better results per square foot of the radiating surface than though the heater was so arranged that the water would boil and flow to the overflow tank as soon as the boiling point was reached.

I have found that by applying this device to the ordinary hot water heating system, a greater amount of heat may be supplied with a less number of radiating feet than if the heating system were arranged so that the water would boil over and discharge through the overflow tank as soon as the boiling point was reached.

Assuming that the pressure within the heating system became great enough to elevate the safety valve 26 against the weight 28, then the water would fill the receptacle 11, flow through the pipes 13 and 15 into the overflow tank and if the expansion and boiling of the water continued long enough would overflow from the said tank. However, when the water began to cool and the pressure upon the under surface of the safety valve 26 was relieved then the valve would at once be closed by the weight 28 and the water in the overflow tank could not return to the heating system. To overcome this difficulty, I have provided the check valve 22 in the receptacle 11 and between the safety valve and the heating system. Hence after the safety valve 26 is closed and the pressure within the system sufficiently reduced, the pressure of the water in the overflow tank will be sufficient to open the safety valve 23 and cause the water to return to the heating system through the safety valve chamber.

One of the advantages of my attachment is that all of the operative parts are securely inclosed so that they are not liable to be broken or misplaced and all of the parts are of simple and inexpensive construction and are composed of materials that may be easily procured wherever plumbers' supplies are sold and the entire attachment may be permanently secured to a heating system, if desired.

By having the top of the over-flow tank open, it is obvious that when the over-flow tank is nearly full of water, there will be no air pressure upon the water exceeding the ordinary atmospheric pressure to tend to hold the safety valve closed and hence a pressure on the under surface of the safety valve sufficient to overcome the weight will permit water to discharge through the safety valve no matter how much water is contained in the over-flow tank. If, on the other hand, the over-flow tank were closed, then as the tank filled with water, the air pressure would become so great that it would require a greatly increased pressure on the under surface of the safety valve to open it. By the term "heating system" as herein used, I refer to a boiler or to any of the pipes of a heating system that are connected with the boiler. My improved pressure regulator may be applied either to the boiler direct, or to any of the water pipes connected therewith.

In Fig. 2 I have shown the pressure regulator attached to a pipe communicating with a steam boiler showing one of the various ways in which my device may be used, and in Fig. 1 I have shown the pressure regulator disconnected from the steam pipe, or source of steam supply. It is to be understood in this connection that the pipes 17 may be connected in any ordinary way with a source of steam supply.

Having thus described my invention, what I claim and desire to secure by Letters Patent of the United States, therefore is—

1. The combination of a closed receptacle having openings at its upper and lower ends, a passageway arranged within the receptacle communicating with the receptacle and with the lower opening, a safety valve adapted to control the upper portion of said passageway, means for yieldingly holding the valve in a closed position and a one-way check valve communicating with said passageway between the safety valve seat and the lower portion of the passageway.

2. The combination of a water receptacle having an opening at its bottom, a pipe communicating with the opening in the bottom and extended upwardly within the receptacle, a safety valve within the receptacle secured to and communicating with the top of said pipe, a check valve within the receptacle arranged to permit the flow of water from the interior of the receptacle to the said pipe below the safety valve, a pipe secured to and communicating with the top of the receptacle, a weight supported within and guided by said pipe, said weight tending to close the safety valve.

3. The combination of a receptacle having an opening at its bottom and an opening at its top, a water heater communicating with the opening in its bottom, a pipe secured to the chamber and communicating with the opening in its top, an overflow tank communicating with the latter pipe, a pipe within the receptacle secured to the bottom of the receptacle and communicating through said opening with the heater, a T at the top of the latter pipe, a check valve communicating with one branch of said T and capable of opening to discharge into the T, said check valve communicating with the interior of the receptacle, a safety valve chamber communicating with the top of the T, a safety valve in the chamber and a weight engaging the safety valve and continued within and guided by the pipe at the top of the receptacle.

Des Moines, Iowa, July 14, 1904.

CHARLES PHELPS.

Witnesses:
   J. B. SMUTNEY,
   W. R. LANE.